(12) United States Patent
Ullmann

(10) Patent No.: US 8,635,462 B2
(45) Date of Patent: Jan. 21, 2014

(54) METHOD AND DEVICE FOR MANAGING ACCESS CONTROL

(75) Inventor: Johannes Ullmann, Vienna (AT)

(73) Assignee: EVVA Sicherheitstechnologie GmbH, Vienna (AT)

( * ) Notice: Subject to any disclaimer, the term of this patent is extended or adjusted under 35 U.S.C. 154(b) by 451 days.

(21) Appl. No.: 12/735,568

(22) PCT Filed: Jan. 30, 2009

(86) PCT No.: PCT/AT2009/000033
§ 371 (c)(1),
(2), (4) Date: Jul. 28, 2010

(87) PCT Pub. No.: WO2009/094683
PCT Pub. Date: Aug. 6, 2009

(65) Prior Publication Data
US 2010/0306549 A1    Dec. 2, 2010

(30) Foreign Application Priority Data

Jan. 30, 2008  (AT) .................................. A 145/2008

(51) Int. Cl.
*H04L 29/06*  (2006.01)
(52) U.S. Cl.
USPC ...................................................... 713/193
(58) Field of Classification Search
USPC ...................................................... 713/193
See application file for complete search history.

(56) References Cited

U.S. PATENT DOCUMENTS

| 6,072,402 | A  | * | 6/2000  | Kniffin et al. ................ 340/5.28 |
| 6,381,695 | B2 | * | 4/2002  | Kudo et al. .................... 713/156 |
| 7,880,584 | B2 | * | 2/2011  | Larson et al. ................. 340/5.73 |
| 8,058,971 | B2 | * | 11/2011 | Harkins et al. ................ 340/5.73 |
| 8,063,734 | B2 | * | 11/2011 | Conforti ........................ 340/5.61 |
| 8,370,911 | B1 | * | 2/2013  | Mallard ............................. 726/7 |
| 8,482,378 | B2 | * | 7/2013  | Sadighi et al. ................. 340/5.2 |
| 2003/0151493 | A1 | * | 8/2003  | Straumann et al. .......... 340/5.25 |
| 2004/0103287 | A1 | * | 5/2004  | Newby et al. ................. 713/184 |
| 2004/0160304 | A1 | * | 8/2004  | Mosgrove et al. ............ 340/5.21 |
| 2005/0174214 | A1 | * | 8/2005  | Ocana .......................... 340/5.65 |
| 2005/0242921 | A1 | * | 11/2005 | Zimmerman et al. ......... 340/5.2 |
| 2006/0072755 | A1 |   | 4/2006  | Oskari et al. |
| 2007/0290798 | A1 | * | 12/2007 | Larson et al. ................. 340/5.73 |

FOREIGN PATENT DOCUMENTS

| EP | 1 336 937 A1 | 8/2003 |
| WO | WO 01/40605 A1 | 6/2001 |
| WO | WO 2006/031173 A1 | 3/2006 |
| WO | WO 2006/082526 A1 | 8/2006 |
| WO | WO 2007/126375 A1 | 11/2007 |

\* cited by examiner

*Primary Examiner* — Michael S McNally
(74) *Attorney, Agent, or Firm* — Chapman and Cutler LLP

(57) ABSTRACT

In a method for managing access control with locking units, particularly locks, and electronic keys, wherein access authorizations are stored and managed in a central processor, the keys are programmed with authorization information for a pregiven selection of locking units as a function of the respective access authorization, the authorization information is wirelessly sent from a key to a locking unit in the event of an access request, and the access authorization is determined in the locking unit as a function of the received authorization information, the programming of a key comprises the sending of the authorization information via a wireless telecommunication network to a wireless mobile telecommunication device and the transmitting of the authorization information received by the mobile telecommunication device to a memory of the key.

32 Claims, 2 Drawing Sheets

METHOD AND DEVICE FOR MANAGING ACCESS CONTROL

Figure 1:
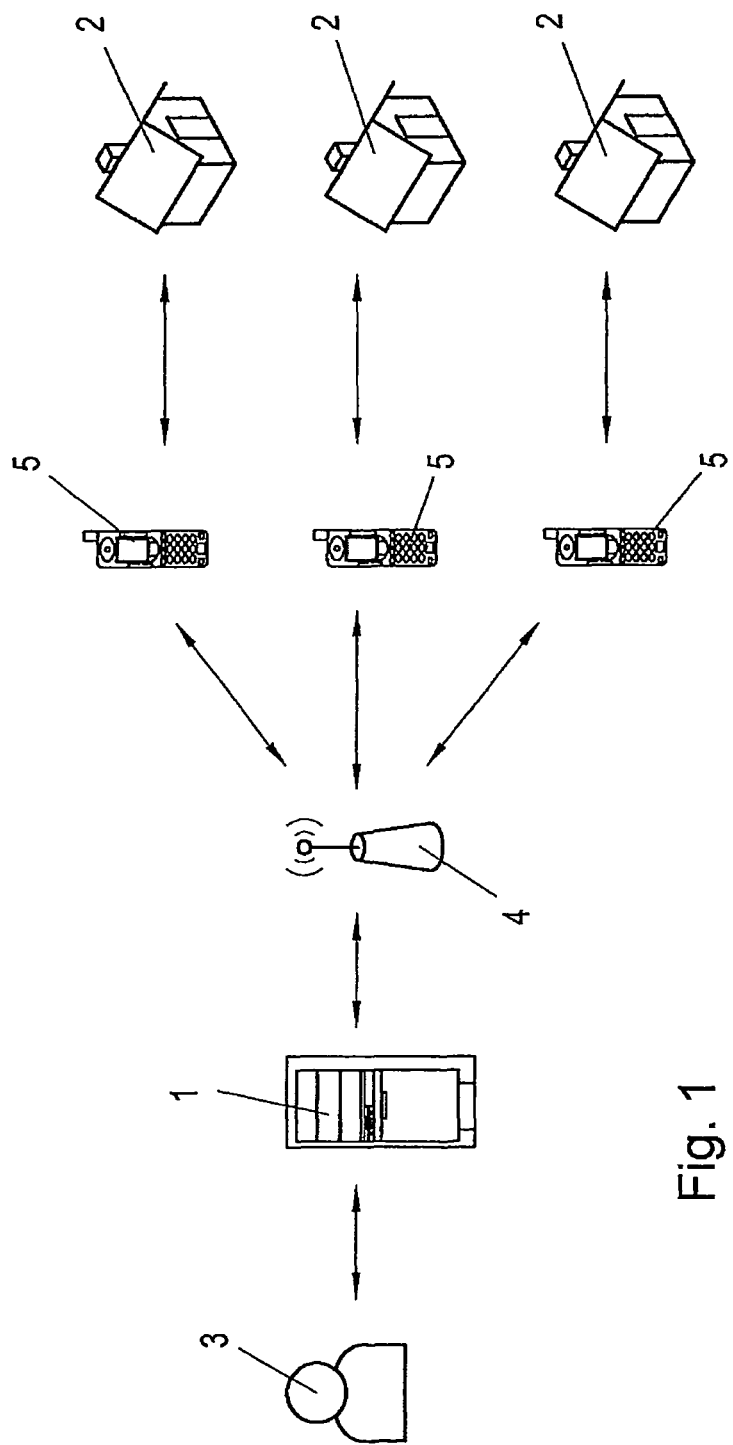

The invention relates to a method for managing access control with locking units, particularly locks, and electronic keys, wherein access authorizations are stored and managed in a central processor, the keys are programmed with authorization information for a pregiven selection of locking units as a function of the respective access authorization, the authorization information is wirelessly sent from a key to a locking unit in the event of an access request, and the access authorization is determined in the locking unit as a function of the received authorization information.

The invention further relates to a device for managing access control, including
- a plurality of locking units, particularly locks, and electronic keys for the wireless locking and unlocking of the locking units,
- a central processor for storing and managing access authorizations,
- means for programming the keys with authorization information for a pregiven selection of locking units as a function of the respective access authorization,
- means for the wireless transmission of the authorization information from the key to the locking unit, wherein the locking unit each comprises an evaluation circuit to determine the access authorization based on the obtained authorization information.

In the context of the invention, the term "locking unit" is meant to comprise electric, electronic or mechatronic locking units and, in particular, locks. In this respect, locking units can comprise various components such as, e.g., read-out means for identification media, particularly electronic keys, a locking electronics system and the like.

There are several options for an electronic access control with contactless systems. Hitherto known RFID systems each comprise an electronic key on which an identification or access code is electronically stored and which is often referred to as a "transponder", as well as a read-out unit. The transponder is usually configured without its own energy source, the required energy being obtained from the electromagnetic field of the read-out device. Furthermore, also radio systems in which the key is an active transmitter having its own energy source (e.g. remote opening of the central locking system of a motor vehicle) are known.

With larger locking systems including a plurality of locking units and electronic keys, the access authorizations are stored in a central processor for easier management. The central processor in those cases usually comprises a database in which the individual locking units, the keys and the respective access authorizations can be managed. The electronic keys can be programmed with access codes and authorization information via a writing device connected to the central processor as a function of the respectively desired access authorizations.

In other systems, the access authorization can be exclusively stored in the respective locking unit, which offers the advantage that the keys themselves need not necessarily be programmed, yet involves the disadvantage of the locking unit having to be provided with the respective information at every change of the access authorization of the locking unit, which will often require direct access to the locking unit.

So far, it has also been known that the components on the door, such as the read-out device, are connected to a network so as to enable a change of the access authorization from a center without having to take a key affected by an access authorization change to a specific point, e.g. a programming station. If, however, the doors and locking units cannot be connected to a network, the problem will arise that, at a change of the access authorization, either the affected keys will have to be available or the changed information will have to be brought to the door by another way than via a network, for instance by the aid of a programming device.

The present invention'aims to improve a method and a device for managing access control to the effect that access authorizations can be provided and changed in a simple manner without having to take the respectively concerned keys to a programming station and, at the same time, without requiring networking of the locking units. Thus, it is to be possible at any time to provide and change access authorizations from a central control station without direct access to the locking units.

To solve this object, the method according to the invention is essentially characterized in that programming a key comprises sending the authorization information via a wireless telecommunication network to a wireless mobile telecommunication device and transmitting the authorization information received by the telecommunication device to a memory of the key.

To solve this object, the device of the initially defined kind is, moreover, further developed according to the invention such that the device further comprises at least one wireless mobile telecommunication device, that the means for programming the keys comprise means for sending the authorization information via a wireless telecommunication network to a first communication interface of the mobile telecommunication device, and that means for transmitting the authorization information received by the mobile telecommunication device to a memory of the key are provided.

Due to the fact that the programming of the keys with authorization information is now effected via a wireless telecommunication network, the authorization information can be sent from the central processor to a wireless mobile telecommunication device of the respectively desired user or owner of the key, provided the mobile telecommunication device is registered in the respective telecommunication network. The authorization information received by the mobile telecommunication device can be made available to a suitable identification medium, which is thus assigned a key function. According to the invention, kind of an "online key" is thus provided, since the key can be reprogrammed via the mobile telecommunication network and the respective mobile terminal to thereby change the authorization information and hence the access authorization of the key owner.

On account of the option of the remote programming of keys, it is no longer necessary to obtain access directly to the individual locking units for a change of the access authorizations. The locking units, after installation and initialization, can operate as autonomous units and, in particular, do not require any network connection. This is of particular advantage if, on account of the local circumstances, the networking of locking units is not desired, for instance if networking expenditures are too costly in the event of smaller locking systems or if structural interventions in the door and in the door region are not desired.

As already mentioned, the authorization information received by the communication device in the context of the invention have to be transmitted to an identification medium in order to either assign a key function to the same or update the authorization information stored on the same. To this end, several options may be envisaged. According to a preferred further development of the invention, it is proceeded in a manner that the mobile telecommunication device itself is used as a key and transmitting the authorization information received by the mobile telecommunication device to a memory of the key comprises writing the authorization information into a memory associated with a communication interface of the mobile telecommunication device for the wireless sending of the authorization information to the locking unit. The device according to the invention in this case is further developed such that the key is formed in the telecommunication device and the memory is configured as a telecommunication device memory connected with a second communication interface of the mobile telecommunication device, which second communication interface is different from the first communication interface and configured for the wireless transmission of the authorization information from the key to the locking unit. Such a further development renders the transmission of the authorization information received by the mobile telecommunication device to an external medium superfluous. The authorization information rather is transmitted directly to a key module integrated in the telecommunication device and, in particular, to a memory of this key module, and saved there. This need not be a dedicated memory of the key module, but can be the main memory of the telecommunication device. The authorization information in this case is stored in such a manner as to be available to a telecommunication interface of the mobile telecommunication device in order to enable the wireless transmission of the authorization information to the locking unit via this communication interface. In a preferred manner, this is a separate communication interface of the telecommunication device, which is different from the communication interface via which the authorization information is received from the central processor. While the communication interface via which the authorization information is received from the central processor is preferably a conventional communication interface of a telecommunication network, such as a GSM or UMTS interface, the communication interface for the wireless sending of authorization information to the locking unit is preferably configured with an accordingly reduced transmission range for local communication. The transmission of the authorization information from the key to the locking unit in this case is preferably done using RFID. According to another preferred further development, the transmission of the authorization information from the key to the locking unit is performed using near-field communication, for instance according to the NFC standard. In a preferred manner, the transmission takes place in a license-free band, or ISM band.

Another option for the transmission of authorization information from the mobile telecommunication device to the key preferably consists in that transmitting the authorization information received by the mobile telecommunication device to a memory of the key comprises using a write-read device for identification media or the like. The device according to the invention in this context is further developed such that the means for transmitting the authorization information received by the mobile telecommunication device to a memory of the key comprises a write-read device for identification media or the like. In such a case, an external identification medium is used as a key, which is programmed by the aid of a writing device, i.e. written with the respective authorization information. This will, of course, require an additional writing procedure and the respective writing means, yet the key in this variant of the invention will be independent of the mobile telecommunication device so as to offer extended applications. As a rule, such external identification media, moreover, do not require their own power supply such that the key function will be maintained even without power supply, whereas sufficient power supply will always have to be ensured if the mobile telecommunication device itself is used as a key.

The invention is preferably further developed such that the authorization information contains at least one lock identification. The presence of a specific lock identification in the key will thus, for instance, mean that with the respective lock identification an access authorization for the locking unit does actually exist.

In this context, it is preferably proceeded according to the invention in that determining the access authorization in the locking unit comprises comparing the received authorization information with the own lock identification stored in the locking unit. The device according to the invention in this case is further developed such that the evaluation circuit of the locking unit comprises a comparator circuit for comparing the received authorization information with the own lock identification. The determination of the access authorization in this case is thus effected using the own lock identification stored in the locking unit, which is preferably an unambiguous lock identification within the locking system and which was assigned to the locking unit and programmed into the locking unit at its initialization.

In order to prevent any unauthorized read-out of authorization information and, in particular, a lock identification from the key as well as the production of key copies, it is preferably proceeded in a manner that the authorization information is provided in the key in an encrypted form. The device according to the invention is consequently further developed to the effect that the evaluation circuit of the locking unit comprises a decryption device.

In this respect, it is in the simplest case preferably proceeded such that any identification information is provided in a form encrypted with a general system key. This will prevent information about actual locking authorizations from being obtained from possibly read-out keys without knowledge of the general system key. A general system key that is firmly stored in every key and every locking unit and cannot be read out will thus readily prevent any subsequent change of the locking authorizations of a key.

The encryption can be realized in various ways. According to a preferred procedure, it is provided that a lock-individual encryption key is each assigned to the locking units, that the authorization information for a locking unit is encrypted with the respectively assigned lock-individual encryption key in the central processor and sent as a lock-individually encrypted authorization information to the telecommunication device and/or the key and stored there, and that the lock-individually encrypted authorization information is decrypted in the locking unit using the assigned lock-individual encryption key stored there. The central processor in this case, therefore, encrypts the authorization information, i.e. for instance the lock identification, in a manner that only the locking unit with the respective lock identification for which an authorization is provided will be able to decrypt the authorization information based on the lock-individual encryption key provided there and subsequently determine the access authorization based on the decrypted information. Any unauthorized reading out of authorization information from the central processor or the key will consequently be unrewarding in the sense of the surrounding of the access control as long as the respectively used lock-individual encryption key is not known.

To further enhance the security, it is preferably proceeded in a manner that a key-individual encryption key is each assigned to the keys, that the authorization information for a key is encrypted with the respectively assigned key-individual encryption key in the central processor and sent as a key-individually encrypted authorization information to the telecommunication device and/or the key and stored there, and that the key-individually encrypted authorization information is decrypted in the key using the assigned key-individual encryption key stored there. By this procedure, the authorization information is encrypted in a key-individual rather than lock-individual manner. The authorization information sent to a given key is thereby encrypted with the encryption key assigned to this key, e.g. a key ID, in a manner that only this key will be able to decrypt or use the authorization information. Any unauthorized reading out of the encrypted authorization information from the key will consequently be unrewarding in the sense of the surrounding of the access control, since the decryption and use of the authorization information will then no longer be possible. To further enhance the security, the key-individual key can simply be coupled with the general system key (e.g. encrypted with the same).

A further enhancement of the security will be possible if the authorization information is encrypted both with a lock-individual encryption key and with a key-individual encryption key. The method in this case is preferably performed in a manner that the authorization information is each at first encrypted with the respective lock-individual encryption key in the central processor, that the lock-individually encrypted authorization information is subsequently encrypted with the key-individual encryption key, that the lock-individually and key-individually encrypted authorization information are sent to the telecommunication device and the key, respectively, and stored there, that the lock-individually and key-individually encrypted authorization information are decrypted in the key using the key-individual encryption key stored in the key, that the (partially) decrypted authorization information is transmitted to the locking unit and decrypted in the locking unit using the lock-individual encryption key stored there. The authorization information is thus double-encrypted, with the decryption being effected in two steps. At first, only that key for which the authorization information is intended will be able to decrypt the key-individual encryption. One or several lock-individually encrypted data package(s) for one or several locking units will then remain in the key. After having transmitted these data to a locking unit, the latter will be able to finally decrypt the data and take the respective action (e.g. access check). Such a procedure might prevent copying attacks along the information path. Moreover, not all of the information paths need be secured, since the data will only be decryptable by the respectively authorized receivers, anyway.

To further enhance the security against unauthorized actions, it is preferably proceeded in a manner that transmitting the authorization information from the key to the locking unit is effected via a secured connection. The device according to the invention in this respect is preferably further developed such that means for producing a secure connection for the transmission of the authorization information from the key to the locking unit are provided. Such a configuration will prevent the authorization information from being "intercepted" during the wireless transmission from the key to the locking unit.

Furthermore, it may also be provided that sending the authorization information from the central processor to the mobile telecommunication device and/or the key is effected via a secured connection.

In the context of the invention, the access authorization need not necessarily be effected by a lock identification. It is also conceivable that the authorization information contains a key identification. A check of the access authorization in the locking unit in such a case can, of course, not be based on a simple comparison with the lock identification stored in the locking unit. The locking unit rather might determine the access authorization from the respective key identification using a computing algorithm. This computing algorithm would also have to be considered when creating the key in the central processor. The authorization information may, however, contain both, namely a lock identification and the respective key identification. This will be of advantage in a preferred procedure, in which determining the access authorization in the locking unit additionally comprises comparing a key identification received by the key with a key identification list stored in the locking unit, wherein access is refused in case of a match of the received key identification with a key identification from the key identification list. The device according to the invention in this respect is preferably further developed such that the locking unit comprises a memory for a key identification list, which with the evaluation circuit in the locking unit comprises the comparison of a key identification received by the key with a key identification stored in the locking unit, wherein access is refused in case of a match of the received key identification with a key identification from the key identification list.

The key identification list stored in the locking unit thus forms a so-called "black list", containing those key identifications for which no access is to be granted in any event, irrespectively of whether an access authorization would result or not from the lock identification transmitted by the key. This will, for instance, be of particular benefit, if individual users of the system are to be banned from acceding and the mobile telecommunication devices of the concerned users are not available to the central processor to accordingly change the authorization information in this way.

According to a preferred procedure, it is proceeded in a manner that the key identification list is stored and managed in the central processor, transmitted to mobile telecommunication devices via the wireless telecommunication network, wirelessly sent to the locking unit from a key, and stored in the locking unit. The device in this context is preferably further developed such that the central processor comprises a memory for the key identification list, and that means for transmitting the key identification list to mobile telecommunication devices via the wireless telecommunication network and for wirelessly sending the key identification list from a key to the locking unit are provided. With such a configuration, the key identification list, which is preferably kept ready in all locking units of a system, can be updated in a simple manner and within a very short time in order to add additional key identifications to the list or delete key identifications from the list. The key identification list of a specific locking unit in this case is updated as soon as the first user whose mobile telecommunication device or key was updated by the central processor in respect to the key identification list approaches the respective locking unit and initiates an opening or closing procedure. If, after such an updating procedure of the key identification list stored in the locking unit, a user wants to initiate an opening or closing procedure whose key identification was by then incorporated into the key identification list, but whose mobile telecommunication device was outside the range of the telecommunication network or could not be reached by the central processor, access will nevertheless be refused to the same.

In order to facilitate the data transfer between the central processor and the mobile telecommunication devices, it is preferably proceeded in a manner that the authorization information and/or the key identification list is/are transmitted as a short message to the mobile telecommunication device via the wireless telecommunication network. The device according to the invention in this context is preferably further developed such that a short-message service is provided for transmitting the authorization information and/or the key identification list as a short message to the mobile tele-communication device via the wireless telecommunication network. The sending of a short message to the mobile telecommunication device offers the advantage that the reception occurs without any chance of intervention or contribution by the user so as to minimize operation expenditures. For a successful data trans-mission, it will suffice if the mobile telecommunication device is within the transmission range of the telecommunication network, and that the device is turned on. No user-side request to the central processor is necessarily required to trigger the transmission of authorization information, status information and the like.

If, however, somebody applies, for instance, for an access authorization to a specific locking unit for which he has not had an access authorization so far, it should be possible for the user to send a respective request to the central processor. To this end, the method is preferably carried out in a manner that sending the authorization information from the central processor to the mobile telecommunication device is effected as a response to a request sent by the user from the mobile telecommunication device to the central processor.

In order to facilitate the management of larger locking installations having a plurality of locking units and keys, it will be advantageous if a survey on the status of the individual locking units can be interrogated in the central processor. To this end, the transmission of status information from the locking units to the central processor will be required. The method according to the invention in this respect is preferably further developed such that status information of the locking unit, e.g. the battery charging state, log data or the like, are wirelessly transmitted to the key and/or the mobile tele-communication device and sent to the central processor by the mobile telecommunication device via the wireless tele-communication network. The device according to the invention in this context is further developed such that the locking unit comprises a memory for status information of the locking unit, such as e.g. the battery charging state, log data or the like, and means for wirelessly transmitting the status information to the key and/or the mobile telecommunication device. If status information is each transmitted at every opening or closing procedure of the locking units, it will be possible to retrieve information on each individual closing and opening procedure in the central processor, relating both to each locking unit and to each key.

Besides the transmission of authorization information, it is, however, also possible to perform a data transmission in the other direction, i.e. from the central processor to individual locking units. Such a data transmission can, for instance, serve the programming of locking units, e.g. in connection with a first start-up, at which every locking unit is provided with a lock identification and, optionally, a lock-individual encryption key. In this case, the mobile telecommunication device via which the data transmission is effected will serve as a programming device for the locking units.

Overall, the invention substantially facilitates access control management without requiring a network connection of the locking units. Therefore, the determination of the access authorization in the locking unit advantageously is merely based on the data obtained from the key and optionally already stored in the locking unit. It is, therefore, not necessary for the determination of the access authorization that the locking unit receives further data from separate control or authentication stations, or from the central processor, in addition to the data respectively obtained from the key for a or during an access control. It is rather provided that the locking units are designed as autonomous units without network connection.

In the following, the invention will be explained in more detail by way of exemplary embodiments schematically illustrated in the drawing. Therein, FIG. 1 illustrates the schematic structure of an access control system in a first configuration; and FIG. 2 illustrates a further configuration of an access control system.

In FIG. 1, a central processor is denoted by 1. The objects to which access is to be controlled by the aid of the access control system, are denoted by 2 and, in the present case, schematically illustrated as houses. The objects 2 each have a door with an RFID-based locking unit. An administrator 3 manages the central processor 1 and can assign access authorizations. The central processor 1 is connected to a mobile wireless tele-communication network 4, such as a GSM mobile network, and can send authorization information to mobile telecommunication devices 5 via the GSM network 4. The mobile telecommunication devices 5 are mobile phones which are equipped with key functions. The mobile phones, for instance, each comprise an RFID module, into whose memory the authorization information obtained from the central processor 1 can be written. In the simplest case, the authorization information is sent to the mobile telecommunication device 5 as a lock identification. If, in a strongly simplified example, the locking units of the objects illustrated in FIG. 1 have the identifications 100, 101 and 102, the transmission of the authorization information to a telecommunication device 5 in the form of the identification 101 will mean that this will correspond to an access authorization for the locking unit having the identification 101. Thus, when the telecommunication device 5, which is used as a key, is taken near a locking unit having the identification 101, and the authorization information, i.e. the lock identification "101", is transmitted to the locking unit in the course of the access authorization check, the locking unit, based on a comparison of the lock identification transmitted by the key with its own lock identification, will recognize the presence of an access authorization in the event of a match, whereupon the lock will be enabled.

Figure 2:
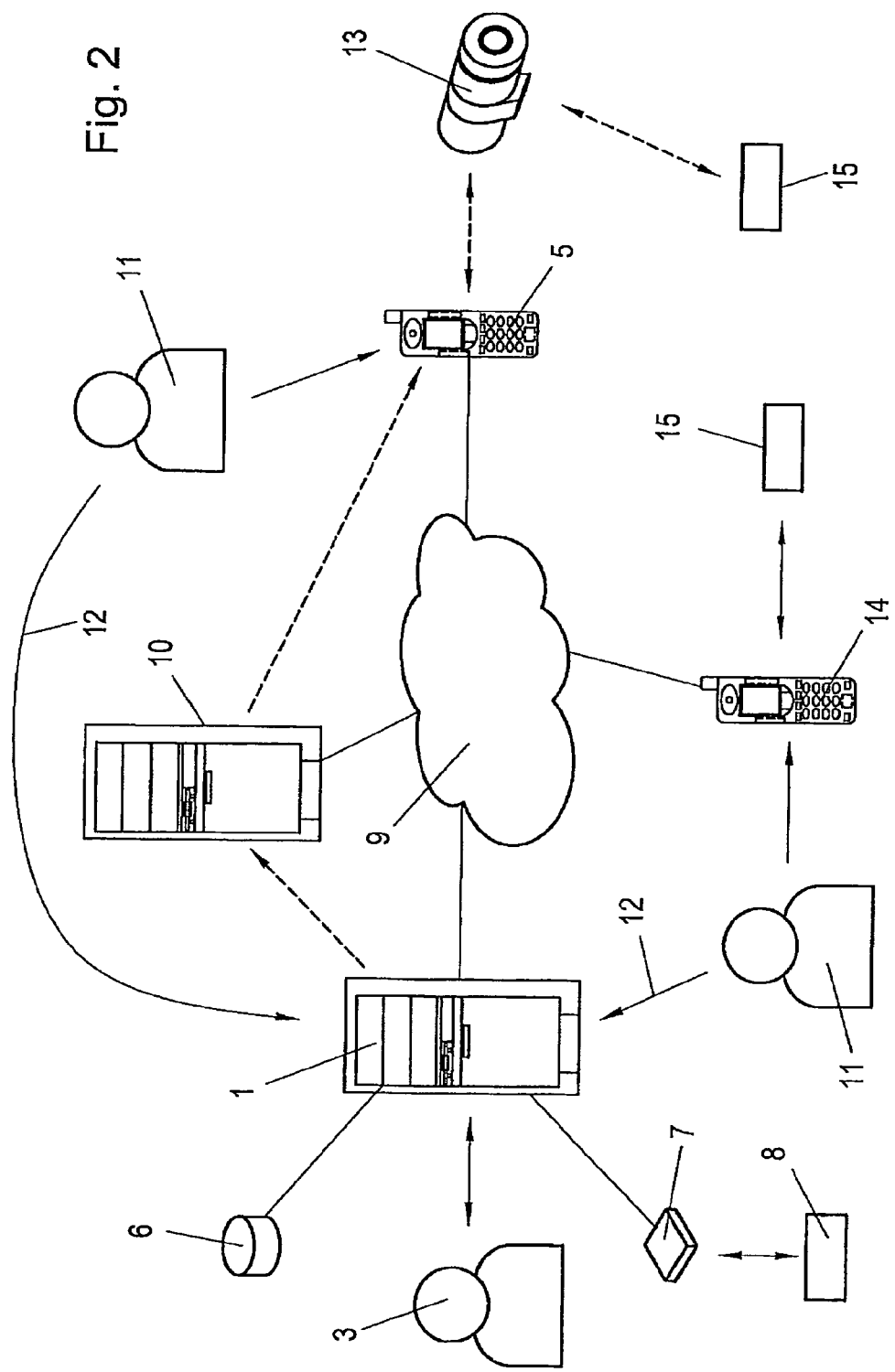

From the illustration of FIG. 2, various applications are apparent. The central processor is again denoted by 1 and the administrator is denoted by 3. The central processor 1 comprises a database 6, or is connected with such a database, on which the access authorizations are stored and managed. The central processor 1 is further connected with a writing unit 7, which is, for instance, configured as a writing instrument for FRID tags or a transponder. At 8, an RFID-transponder is illustrated, which can be written by a writing unit 7. This basically corresponds to a conventional method for programming RFID transponders.

A data connection between a mobile telecommunication device 5 and the central processor 1 according to the illustration of FIG. 2 can be realized in various ways. A wireless connection with the internet 9 can, for instance, be established via various connection protocols such as, e.g., W-LAN, GSM or UMTS, wherein also the central processor 1 is connected with the Internet 9. Alternately or additionally, an SMS gateway 10 may be provided such that the data exchange between the central processor 1 and the mobile telecommunication device 5 is effected through a short-message service.

A user 11 of the mobile telecommunication device 5 in this case can access the central processor 1 as indicated by line 12 and, having the required right of access to the central processor 1, can manage the access authorizations. Unless the user 11 is the administrator, the access to the central processor 1 granted to him will be such that he will only be allowed to manage, and optionally change, his own access authorizations. Access to the central processor 1 can, for instance, be effected via a WEB interface so as to enable the user 11 to manage his access authorizations using any web-enabled computer.

The mobile telecommunication device denoted by 5 in FIG. 2 may be a mobile phone equipped with an NFC module. In this case, the authorization information obtained from the central processor 1 is made available to the integrated NFC module so as to enable the authorization information to be transmitted to a locking unit 13 via an NFC connection.

FIG. 2 depicts a further mobile telecommunication device 14 which itself does not assume a key function. The authorization information transmitted by the central processor 1 is rather transferred to an external RFID transponder 15. The RFID transponder 15 can then be used independently of the mobile telecommunication device 14 to lock locking units 13.

The invention claimed is:

1. A method for managing access control with locking units and electronic keys, comprising:
   storing and managing access authorizations in a central processor,
   programming keys with authorization information for a pregiven selection of locking units as a function of respective access authorization,
   sending authorization information wirelessly from a key to a locking unit in an event of an access request, and
   determining access authorization in the locking unit as a function of received authorization information, wherein determining the access authorization in the locking unit comprises comparing a key identification received by the key with a key identification list stored in the locking unit, and access is refused in case of a match of the received key identification with a key identification from the key identification list,
   wherein programming a key comprises sending the authorization information via a wireless telecommunication network to a wireless mobile telecommunication device and transmitting the authorization information received by the telecommunication device to a memory of the key, and the key identification list is stored and managed in the central processor, transmitted to mobile telecommunication devices via the wireless telecommunication network, wirelessly sent from a key to the locking unit, and stored in the locking unit, and
   wherein a key-individual encryption key is assigned to each of the keys, the authorization information for a key is encrypted with the respectively assigned key-individual encryption key in the central processor and sent as a key-individually encrypted authorization information to the telecommunication device and/or the key and stored there, and the key-individually encrypted authorization information is decrypted in the key using the assigned key-individual encryption key stored there.

2. A method according to claim 1, wherein the mobile telecommunication device is used as a key, and transmitting the authorization information received by the mobile telecommunication device to a memory of the key comprises writing the authorization information into a memory associated with a communication interface of the mobile telecommunication device for the wireless sending of the authorization information to the locking unit.

3. A method according to claim 1, wherein transmitting the authorization information received by the mobile telecommunication device to a memory of the key comprises using a write-read device for identification media.

4. A method according to claim 1, wherein the authorization information contains at least one lock identification.

5. A method according to claim 4, wherein determining the access authorization in the locking unit comprises comparing the received authorization information with the one lock identification stored in the locking unit.

6. A method according to claim 1, wherein the authorization information is provided in the key in an encrypted form.

7. A method according to claim 1, wherein any identification information is provided in a form encrypted with a general system key.

8. A method according to claim 1, wherein a lock-individual encryption key is assigned to each of the locking units, the authorization information for each of the locking units is encrypted with a respectively assigned lock-individual encryption key in the central processor and sent as a lock-individually encrypted authorization information to the telecommunication device and/or the key and stored there, and the lock-individually encrypted authorization information is decrypted in the locking unit using the lock-individual encryption key assigned and stored there.

9. A method according to claim 8, wherein
   a key-individual encryption key is assigned to each of the keys, the authorization information for a key is encrypted with the respectively assigned key-individual encryption key in the central processor and sent as a key-individually encrypted authorization information to the telecommunication device and/or the key and stored there, and the key-individually encrypted authorization information is decrypted in the key using the assigned key-individual encryption key stored there, and
   the authorization information is at first encrypted with the respective lock-individual encryption key in the central processor, the lock-individually encrypted authorization information is subsequently encrypted with the key-individual encryption key, the lock-individually and key-individually encrypted authorization information are sent to the telecommunication device and the key, respectively, and stored there, the lock-individually and key-individually encrypted authorization information are decrypted in the key using the key-individual encryption key stored in the key, and the decrypted authorization information is transmitted to the locking unit and decrypted in the locking unit using the lock-individual encryption key stored there.

10. A method according to claim 1, wherein transmitting the authorization information from the key to the locking unit is effected via a secured connection.

11. A method according to claim 1, wherein sending the authorization information from the central processor to the mobile telecommunication device and/or the key is effected via a secured connection.

12. A method according to claim 1, wherein transmitting the authorization information from the key to the locking unit is effected using RFID.

13. A method according to claim 1, wherein transmitting the authorization information from the key to the locking unit is performed using near-field communication.

14. A method according to claim 1, wherein at least one of the authorization information and the key identification list is transmitted as a short message to the mobile telecommunication device via the wireless telecommunication network.

15. A method according to claim 1, wherein determining the access authorization in the locking unit is based solely on data obtained from the key.

16. A method according to claim 1, wherein sending the authorization information from the central processor to the mobile telecommunication device is effected as a response to a request sent by a user from the mobile telecommunication device to the central processor.

17. A method according to claim 1, wherein status information of the locking unit is wirelessly transmitted to the key and/or the mobile telecommunication device and sent to the central processor by the mobile telecommunication device via the wireless telecommunication network.

18. A device for managing access control, comprising:
a plurality of locking units and a plurality of keys for wireless locking and unlocking of the locking units,
a central processor that stores and manages access authorizations, and that programs the keys with authorization information for a pregiven selection of locking units as a function of respective access authorization,
a transponder that wirelessly transmits the authorization information from the key to the locking unit,
at least one wireless mobile telecommunication device adapted to transmit the authorization information sent by the central processor and received by the mobile telecommunication device to a memory of the key,
wherein each of the locking units comprises an evaluation circuit to determine the access authorization based on the obtained authorization information, and each of the locking units comprises a memory for a key identification list, which cooperates with the evaluation circuit in a manner that the determination of the access authorization in the locking unit comprises the comparison of a key identification received by the key with a key identification list stored in the locking unit, wherein access is refused in case of a match of the received key identification with a key identification from the key identification list,
wherein the central processor sends the authorization information via a wireless telecommunication network to a first communication interface of the mobile telecommunication device,
wherein the central processor comprises a memory for the key identification list, and transmits the key identification list to mobile telecommunication devices via the wireless tele-communication network, and the key is adapted to wirelessly send the key identification list to the locking unit, and
wherein the authorization information is present in the key in a key-individually encrypted form, and that the key comprises a decryption device.

19. A device according to claim 18, wherein the key is formed in the telecommunication device and the memory is configured as a telecommunication device memory connected with a second communication interface of the mobile telecommunication device, which second communication interface is different from the first communication interface and is configured for the wireless transmission of the authorization information from the key to the locking unit.

20. A device according to claim 18, wherein the mobile telecommunication device transmits the authorization information received by the mobile telecommunication device to a memory of the key via a write-read device for identification media.

21. A device according to claim 18, wherein the authorization information contains at least one lock identification.

22. A device according to claim 21, wherein the evaluation circuit of the locking unit comprises a comparator circuit for comparing the received authorization information with the one lock identification.

23. A device according to claim 18, wherein the authorization information is present in the key in an encrypted form.

24. A device according to claim 18, wherein any identification information is present in a form encrypted with a general system key.

25. A device according to claim 18, wherein the authorization information is present in a lock-individually encrypted form, and that the evaluation circuit comprises a decryption device.

26. A device according to claim 18, wherein the device further comprises a secure connection for the transmission of the authorization information from the key to the locking unit.

27. A device according to claim 18, wherein the device further comprises a secure connection for the sending of the authorization information from the central processor to at least one of the mobile telecommunication device and the key.

28. A device according to claim 18, wherein the key is configured as an RFID data carrier.

29. A device according to claim 18, wherein the wireless transmission of the authorization information from the key to the locking unit is conducted using near-field communication.

30. A device according to claim 18, wherein the device further comprises a short-message service for transmitting the authorization information and/or the key identification list as a short message to the mobile telecommunication device via the wireless telecommunication network.

31. A device according to claim 18, wherein the locking units are designed as autonomous units without network connection, and wherein the determination of the access authorization in the locking unit is effected solely based on the data received by the key.

32. A device according to claim 18, wherein the locking unit comprises a memory for status information of the locking unit, and the status information is wirelessly transmitted to the key and/or the mobile telecommunication device.

* * * * *